United States Patent [19]
Nicholson et al.

[11] Patent Number: 5,577,742
[45] Date of Patent: Nov. 26, 1996

[54] METALLIC STEM SEAL WITH INCLINED CHANNEL AND INTEGRAL SUPPORT MEMBER

[75] Inventors: Terence P. Nicholson, Hexham, United Kingdom; Michael J. C. Tozer, Stocksfield, Netherlands

[73] Assignee: Specialist Sealing Limited, Jersey, Channel Islands

[21] Appl. No.: 483,066

[22] Filed: Jun. 6, 1995

[30] Foreign Application Priority Data

Mar. 21, 1995 [GB] United Kingdom ............... 9505717

[51] Int. Cl.⁶ ........................................ F16J 15/56
[52] U.S. Cl. ...................... 277/203; 277/213; 277/236
[58] Field of Search ................... 277/200, 203, 277/213, 212 FB, 236, 33

[56] References Cited

U.S. PATENT DOCUMENTS

| | | | |
|---|---|---|---|
| 1,773,749 | 8/1930 | Petersen | 277/236 |
| 1,840,312 | 1/1932 | Dunmire | 277/213 |
| 2,064,235 | 12/1936 | Wheeler | 277/203 |
| 2,356,947 | 8/1944 | Pranger et al. | 277/213 |
| 3,331,608 | 7/1967 | Charrault et al. | 277/203 |
| 3,427,034 | 2/1969 | Lowe | 277/213 |
| 3,595,588 | 7/1971 | Rode | 277/236 |
| 4,135,723 | 1/1979 | Urquhart | 277/203 |
| 4,751,965 | 6/1988 | Cassity | 277/236 |
| 5,031,923 | 7/1991 | Davies | 277/236 |

FOREIGN PATENT DOCUMENTS

| | | | |
|---|---|---|---|
| 494703 | 7/1950 | Belgium | 277/213 |
| 3126716 | 1/1983 | Germany | 277/213 |
| 284313 | 4/1931 | Italy | 277/213 |
| 186594 | 8/1922 | United Kingdom | 277/236 |
| 2046373 | 3/1979 | United Kingdom . | |

*Primary Examiner*—Scott Cummings
*Attorney, Agent, or Firm*—Harness, Dickey & Pierce, P.L.C.

[57] ABSTRACT

A valve stem seal comprising a cylindrical stem-sealing membrane and a membrane supporting flange. The membrane has a corrugated profile which defines one or more loop-shaped channels bounded by contact surfaces on a radially inner face and each channel is inclined at 5°–10° with respect to a plane perpendicular to the longitudinal axis. The channels form a labyrinth seal for any fluid leaking along the outer surface of the stem. A support bearing for the stem is provided on the membrane supporting flange.

13 Claims, 4 Drawing Sheets

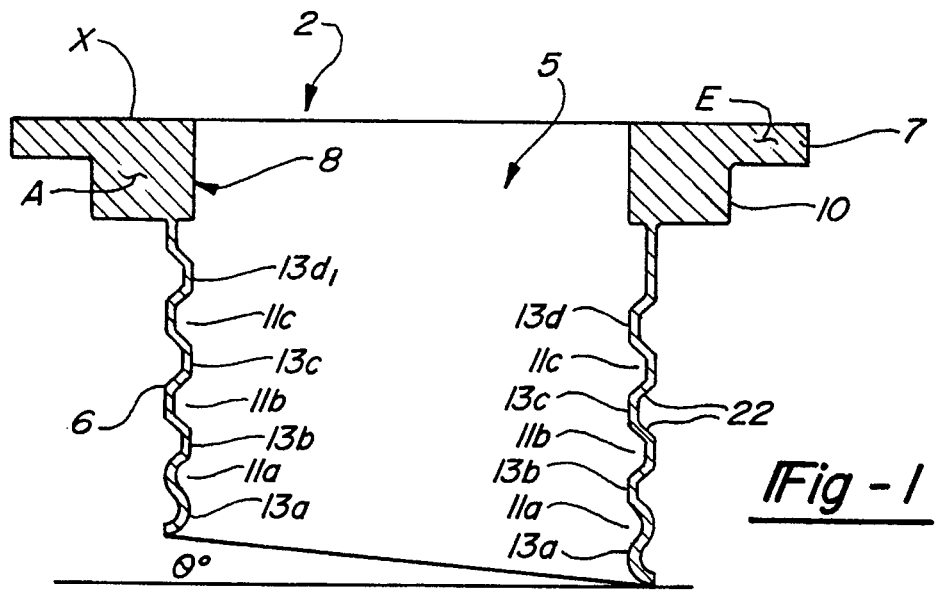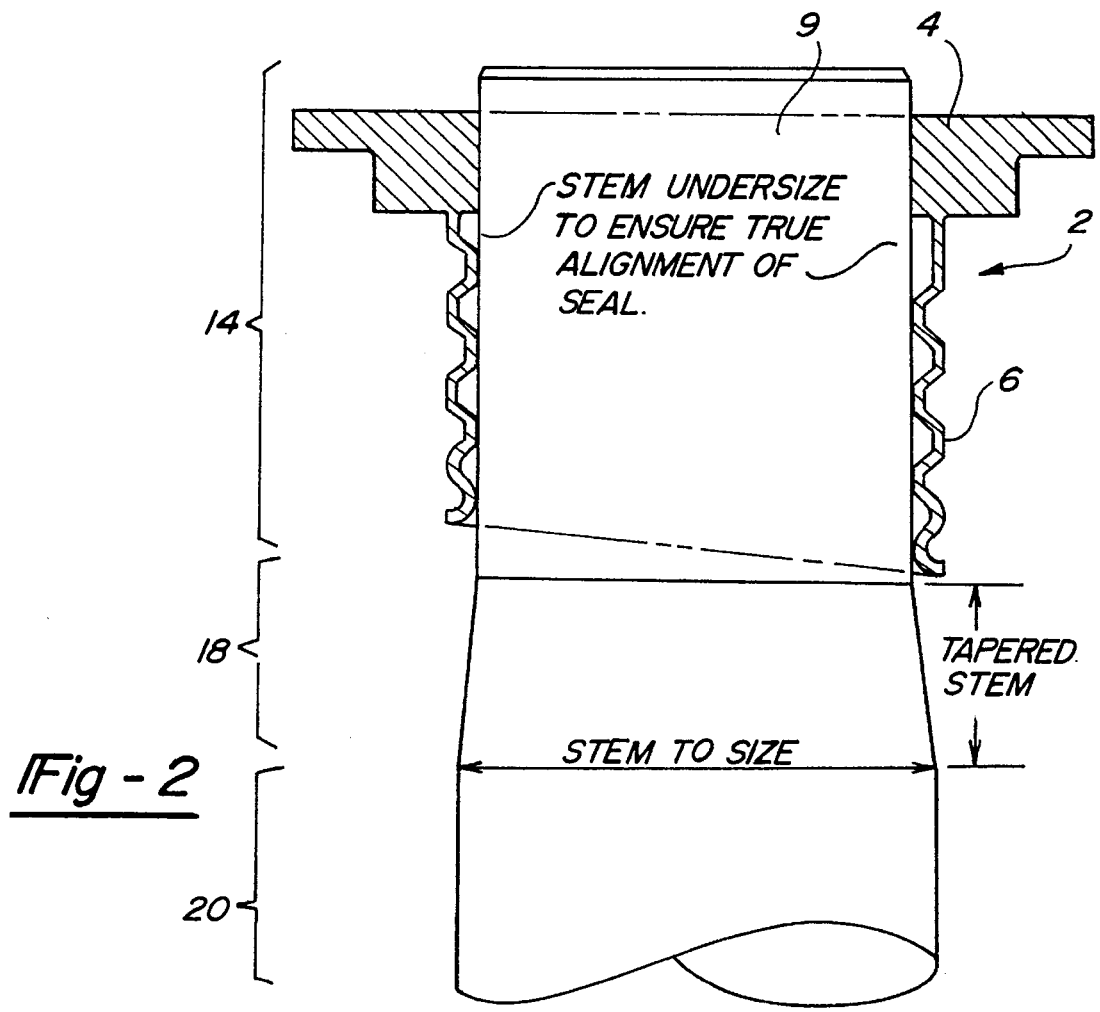

METALLIC STEM SEAL WITH INCLINED CHANNEL AND INTEGRAL SUPPORT MEMBER

This invention relates to a stem seal. More particularly, but not exclusively, the invention relates to a stem seal for establishing a fluid-tight seal about a valve stem by which a valve is opened and closed.

Conventional stem seals include arrangements in which asbestos or PTFE is packed around the valve stem to block the flow of fluid. Such a seal usually provides a resistance to fire which is significantly less than that of the valve body. This is highly undesirable from the point of view of safety.

With this in mind, an object of the present invention is to provide a stem seal which has a fire resistance equivalent to that of a valve body and its specification. This implies the use of an all-metal seal, but metal/metal seals involve practical problems.

A stem seal should desirably have the following characteristics:

i) fluid-tightness at both low and high fluid pressures;

ii) low operational torque;

iii) long life; and iv) equally good sealing characteristics regardless of whether the operation of the stem is reciprocating, rotational or both.

An object of the invention is to provide a seal meeting these criteria.

According to the invention there is provided a stem seal, comprising one or more generally cylindrical sealing membranes and membrane-supporting means for supporting the or each sealing membrane in position about and in contact with a respective stem, wherein the or each sealing membrane comprises one or more loop-shaped channels encircling the stem in use and bounded by contact surfaces on a radially inner face thereof and the or each said channel is inclined with respect to a plane perpendicular to the longitudinal axis of the or each membrane.

Such a stem seal can be made from metal, thus providing the desired degree of fire resistance. Furthermore, because the or each channel provides an interruption in the surface contact between the radially inner surface of the sealing membrane and the radially outer surface of the stem, a pressure drop is experienced in the or each channel, thus, resisting leakage and providing an excellent seal. Furthermore, the seal is self-energising because the sealed pressure fluid can act on the external surface of the membrane, so that excellent sealing is provided at high pressures as well as low pressures.

Due to the inclined nature of the channels and the resulting inclined boundaries to the contact faces, it is relatively simple to insert a stem into a sealing membrane even with an interference fit, as the hoop-strength resistance is not as large as it would be if the channels were orientated perpendicular to the longitudinal axis of the membrane. Furthermore, this enables both reciprocating and rotational operation of the stem whilst maintaining a high seal. It will be understood that the present seal has a corrugated longitudinal profile. We have found that a seal in the form of a corrugated tube, with the corrugations at right angles to the tube access, strongly resists being fitted about a stem with an interference fit, and when so fitted, strongly resists movement of the stem in the seal membrane. In effect, the seal membrane tends to "wind up" and bind onto the stem, making movement of the latter difficult or impossible.

However it was unexpectedly found that, if the corrugations are tilted relative to the longitudinal axis, the tendency of the membrane to wind up and bind onto the stem is eliminated without impairing the seal provided by the interference fit between the seal and the stem, so that such a seal can be fitted relatively easily, and does not seriously impede operating movement of the stem within the seal.

The angle at which the corrugations are inclined to the radial direction is preferably not less than about 5°. Preferably, the angle should not be more than about 10°.

In one preferred embodiment of the invention, the seal comprises two coaxial sealing membranes extending in respectively opposite directions from the said membrane supporting means. This provides a seal which is fully reversible for sub-sea operation.

Further preferred features of the invention are set out in the appended claims.

Embodiments of the invention will now be described, by way of example, and with reference to the accompanying drawings in which:

FIG. 1 is a sectional view of a first embodiment of a seal in accordance with the present invention;

FIG. 2 is a view corresponding to FIG. 1, but showing the seal being fitted to a stem;

Figure 3:
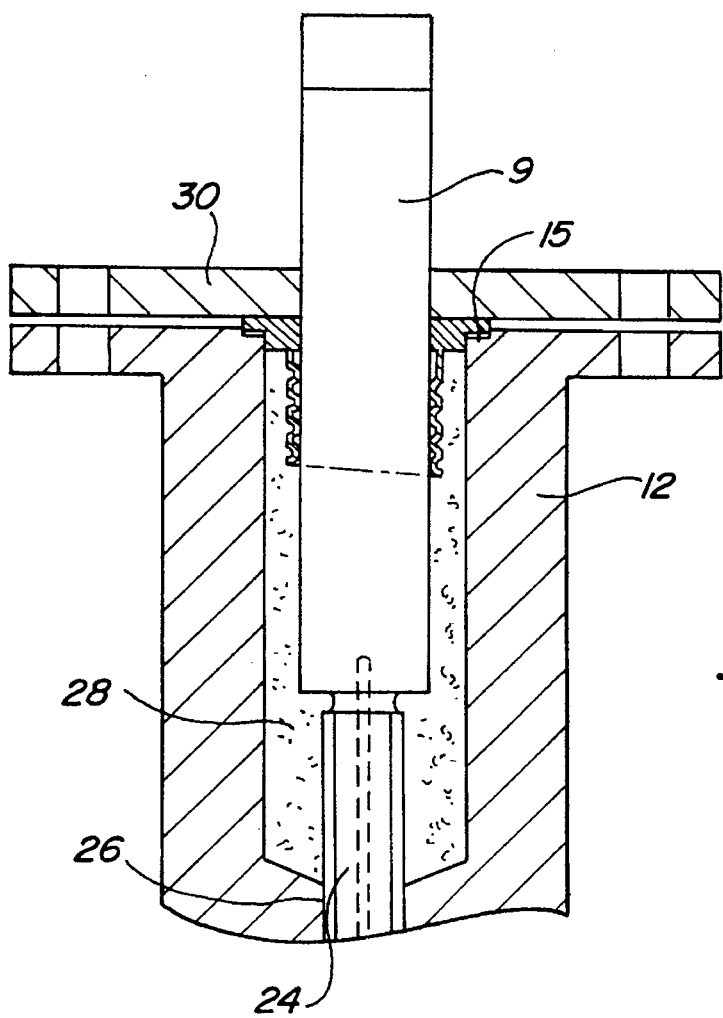
FIG. 3 is a view similar to FIG. 2, but on a reduced scale, to show the position of the fully fitted seal and stem in relation to a valve unit.

FIG. 1 shows a first embodiment of a metal stem seal 2 in accordance with the invention. The seal 2 comprises an annular collar 4 and an integral tubular sealing membrane 6 with a corrugated profile. The sealing membrane 6 is generally cylindrical and is coaxial with the collar 4. The collar 4 comprises a central aperture 5 which communicates directly with the inside of the sealing membrane 6, and a radially outwardly directed flange 7.

The collar 4 fulfils numerous functions.

First, the radially inner wall 8 of the collar 4, which defines the aperture 5, also serves as a bearing surface which acts as the main support bearing for the valve stem 9 (FIGS. 2, 3). This is enabled by the fact that the collar 4 comprises a radially outer surface 10 which locates against a radially inner surface of a valve body 12 (see FIG. 3), thus seating the seal as a whole and resisting lateral movement. The internal diameter of the aperture 5 is slightly greater than the outer diameter of the stem, so as to enable the desired degree of relative movement.

Second, the collar 4, by virtue of the radially outwardly directed flange 7, serves to locate the seal axially within the valve body 12 and, by cooperation with appropriate formations in the valve body ( i.e. annular rebate 15), restrain it axially with respect to the valve stem 9 (see FIG. 3).

Third, the collar acts as a mount or support for the sealing membrane 6, thereby controlling its axial and radial position.

The sealing membrane 6 comprises three loop-shaped internal channels 11a, 11b, 11c which are bounded by loop-shaped internal contact surfaces 13a–13d, defined by the corrugated form of the membrane wall, which is of substantially constant thickness.

The contact surfaces 13a–13d project radially inwardly to the extent that they provide an interference fit on the valve stem, thereby effecting a multiplicity of sealing areas encircling the stem. The degree of interference is calculated to meet the desired seating load on the stem to ensure a fluid-tight seal. In use, therefore, the channels are isolated from one another.

The main part of the valve stem 9, about which the seal fits when in use, has a diameter greater than the relaxed internal diameter of the seal at the seal surfaces 13a–13d, so that in use there is an interference fit between these areas of the seal and the valve stem. In order to make it easier to fit the seal on the valve stem and ensure true alignment of the seal on the stem, the stem has a lead-in region 14 of reduced diameter, slightly less than the natural bore diameter of the seal, over an axial length of the stem exceeding the axial length of the seal. The seal is initially fitted easily over the reduced-diameter lead-in region 14, which establishes the correct alignment of the seal relative to the shaft. A tapered region 18 of the stem provides a gradual transition from the lead-in region 14 to the full-diameter main portion 20 of the stem. The seal can be forced over the tapered region and onto the full-diameter region 20 on which it makes the previously described interference fit.

Preferably, to avoid damage to or distortion of the seal during fitting onto the stem region 20, the seal is initially heated to make it expand radially and/or the stem is chilled to shrink it, to such an extent that the seal fits freely over the stem. When the components return to their normal temperatures thermal contraction or expansion produces the desired interference fit between them.

The successive contact surfaces 13a–13d form self-energizing contact seals. The channels 11a–11c between these contact seals provide a labyrinth-type seal action. This almost completely eliminates the possibility of any seepage past the seal. This is because, as the fluid seeps along the stem from channel to channel, there is a pressure drop at each stage and after several such drops the fluid has insufficient pressure to leak past the next contact surface.

It can be clearly seen from FIG. 1 that the channels 11a–11c and contact surfaces 13a–13d are inclined at an angle to the plane perpendicular to the longitudinal axis. This effectively causes each of the channels 11a–11c and contact surfaces 13a–13d to be oval or elliptical, rather than circular. This introduces flexibility into the sealing membrane 6.

If the seals and contact surfaces were circular and perpendicular to the longitudinal axis of the sealing membrane, the resulting seal would have such a large hoop strength and inflexibility that the hoops, plus the pressure loading on the seal, result in a seal which is only operational with a reciprocating motion of the stem and which is also liable to suffer excessive wear.

In the illustrated embodiment, the contact surfaces 13 and the intervening channels 11 lie at an angle of substantially 6.5° to the radial direction, that is to say, to a plane perpendicular to the longitudinal axis of the seal and stem.

It will be seen that the three innermost (i.e. away from the free end of the seal) contact surfaces 13b–13d have generally flat contact faces and make a real surface contact with the stem. The axially outer contact surface 13a has an arcuate profile and, accordingly, makes substantially linear contact. This configuration is provided because the contact surface 13a is not just a sealing element. Its main function is to act as a leading edge or guide, so as to prevent any possibility of accidental damage when the seal is slid into position on the stem. This is important because the fact that the contact surfaces and channels are not perpendicular to the longitudinal axis of the seal increases the risk of damage.

The seal membrane is initially formed integrally with the collar 4, but as a cylinder having straight sides. The channels and contact surfaces are then formed by a rolling operation. After this, the internal surfaces of the sealing membrane are lapped to size and polished.

Figure 5:
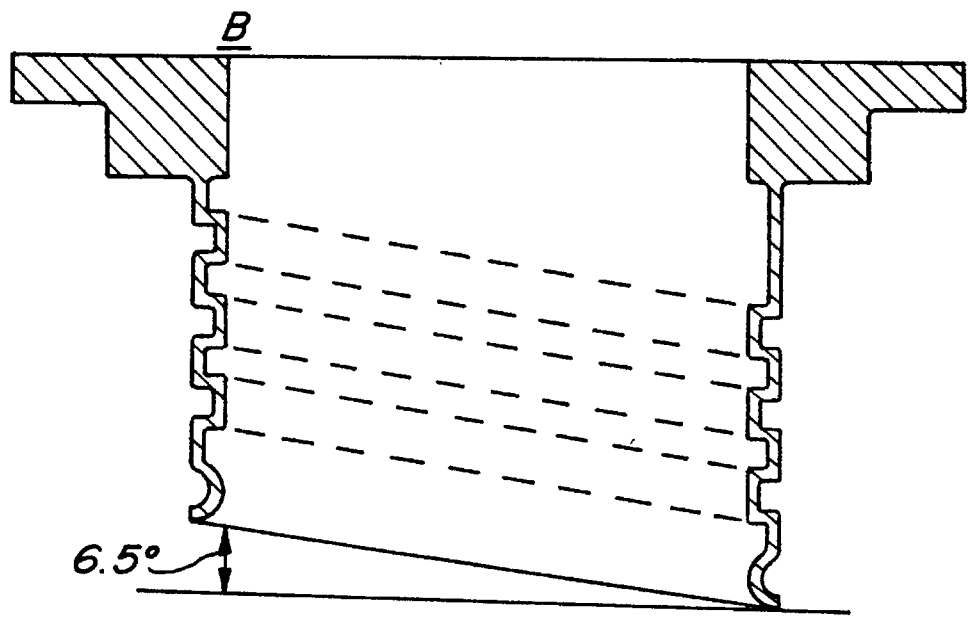
FIG. 5 is a view similar to FIG. 1, but showing a second embodiment of the invention.
Figure 6:
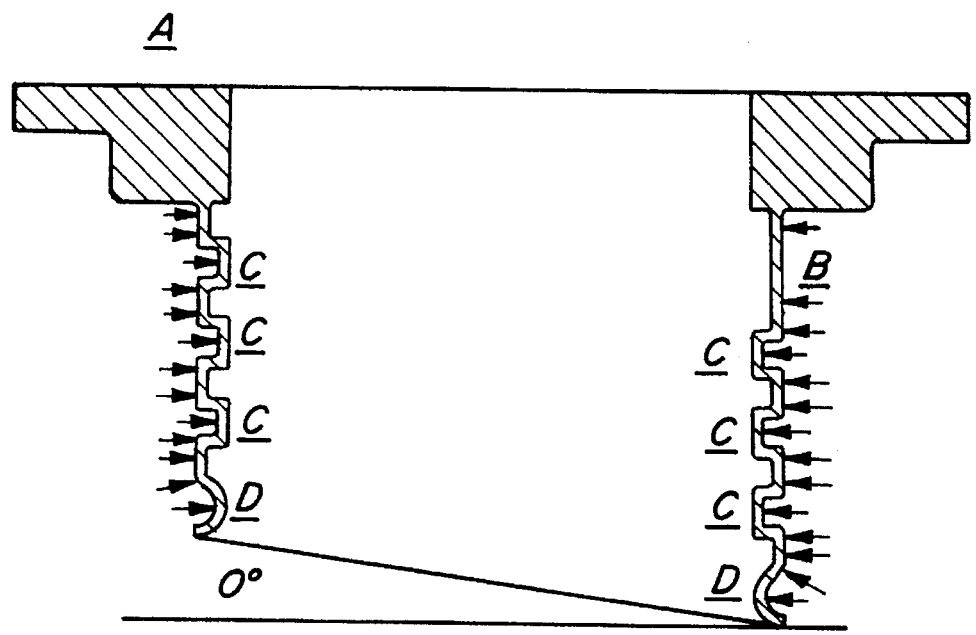
FIG. 6 is a view corresponding to FIG. 4, but showing the second embodiment of the invention.

This results in a very good, light-weight seal which is also very cost effective. However, a rolling process produces corrugations of which the side walls 22 lie obliquely relative to the longitudinal and radial directions of the seal. As a result, if this seal were to be subjected to extremely high pressures, the undulations could slowly flatten out until leakage occurred. This is obviously undesirable. Therefore, an alternative embodiment of the invention is fully machined from solid material and incorporates a much more highly rectangular profile for the contact surfaces and channels. This embodiment is shown in FIGS. 5 and 6.

Whilst the principle is the same, it will readily be seen that the machining employed in the manufacture of the second embodiment of the seal results in a castellated profile which is far more difficult to flatten, even under the most extreme of pressures, thereby ensuring a combination of outstanding performance and long life. Such characteristics are of critical importance in sub-sea operations, for example.

In order to ensure that the desired sealing qualities are obtained, it is very important that both the inner sealing surfaces of the seal and the surface of the shaft are of the highest quality—to the extent that diametric manufacturing tolerances and the polished finish result in an accuracy to within 2 to 3µ inches. This is particularly important when sealing is against so-called "thin" gases such as nitrogen and helium.

Figure 4:
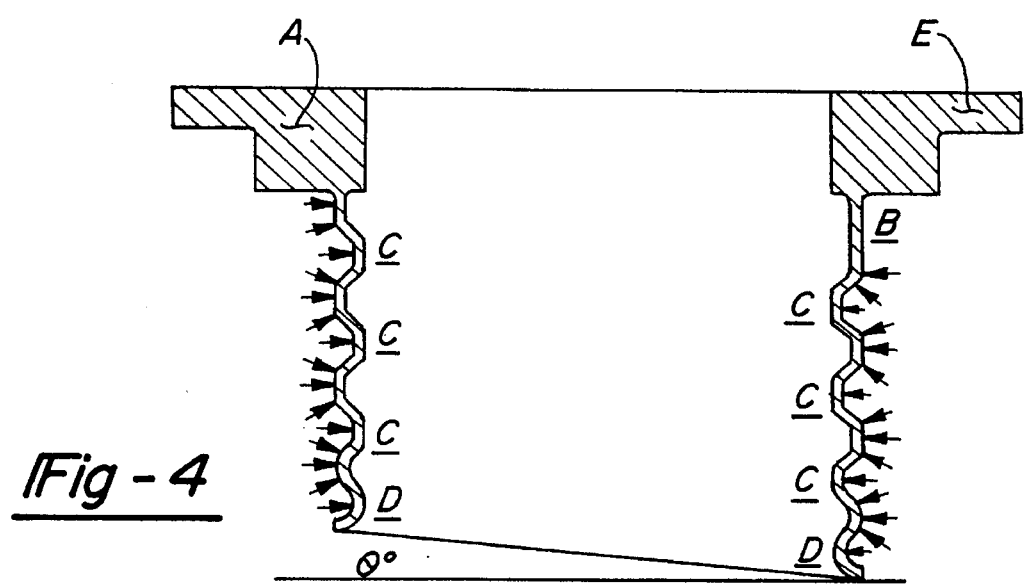
FIG. 4 is a view similar to FIG. 1, but further showing the distribution of the load exerted on the seal by a pressurized medium during use.

A good seal is achieved partly due to the self-energising nature of the seal. This can be more easily understood with reference to FIGS. 4 and 6, which respectively show how the pressurised medium exerts its load over the total area of the outside of the sealing membrane in question, thereby ensuring that leakage does not occur. The arrangement of successive channels 11a–11c also serves to prevent seepage, as discussed above. The maintenance of the ability to rotate the stem is achieved due to the oval configuration of the contact surfaces and channels, because tee combined rotation and reciprocation of the stem in the seal causes minute changes in the inside diameter, thereby relaxing any rigidity in the grip on the stem.

During testing, the seals were mounted in a test rig similar to the arrangement shown in FIG. 3 and the stem was subjected to a combined reciprocal and rotational motion at nitrogen gas pressures ranging from atmospheric to 17,000 p.s.i. It was found that a perfect seal was maintained. Although there was an increase in the rotational torque that was required to turn the stem, this was still well within hand-operation limits.

In use, the present stem seal can be installed for example in a gate valve, ball valve, butterfly valve or plug valve to seal the valve-operating stem, or it can be used in any other application where sealing of a stem or shaft moving longitudinally and/or in rotation at relatively low speed is required. Conversely the seal can provide sealing between a rotating outer element and a static stem or shaft.

FIG. 3 shows, by way of example only, a stem seal in accordance with FIG. 1 installed in a housing 12 of a valve provided with an operating stem 9, of which a lower region 24, below the stem region on which the seal is fitted, has an external screw thread in mesh with a screw-threaded bore 26 of the valve body, so as to generate a valve-operating motion on rotation of the valve stem. The upper part of the valve body contains a cylindrical chamber 28 providing a clearance around the valve stem and around the external surface of the seal. The seal is located in the upper end of this chamber and is retained by a fixing plate 30 which clamps the seal flange 7 onto the valve body, suitable seals being provided between these components.

In use, fluid under pressure from the valve can enter the chamber 28, within which it acts on the external surface of the corrugated seal membrane, providing the self-energizing sealing action described above.

The foregoing test results were achieved without any special coatings being applied to the seal or stem. However, the addition of a low friction coating would serve to counteract the recorded increase in rotational torque.

Figure 7:
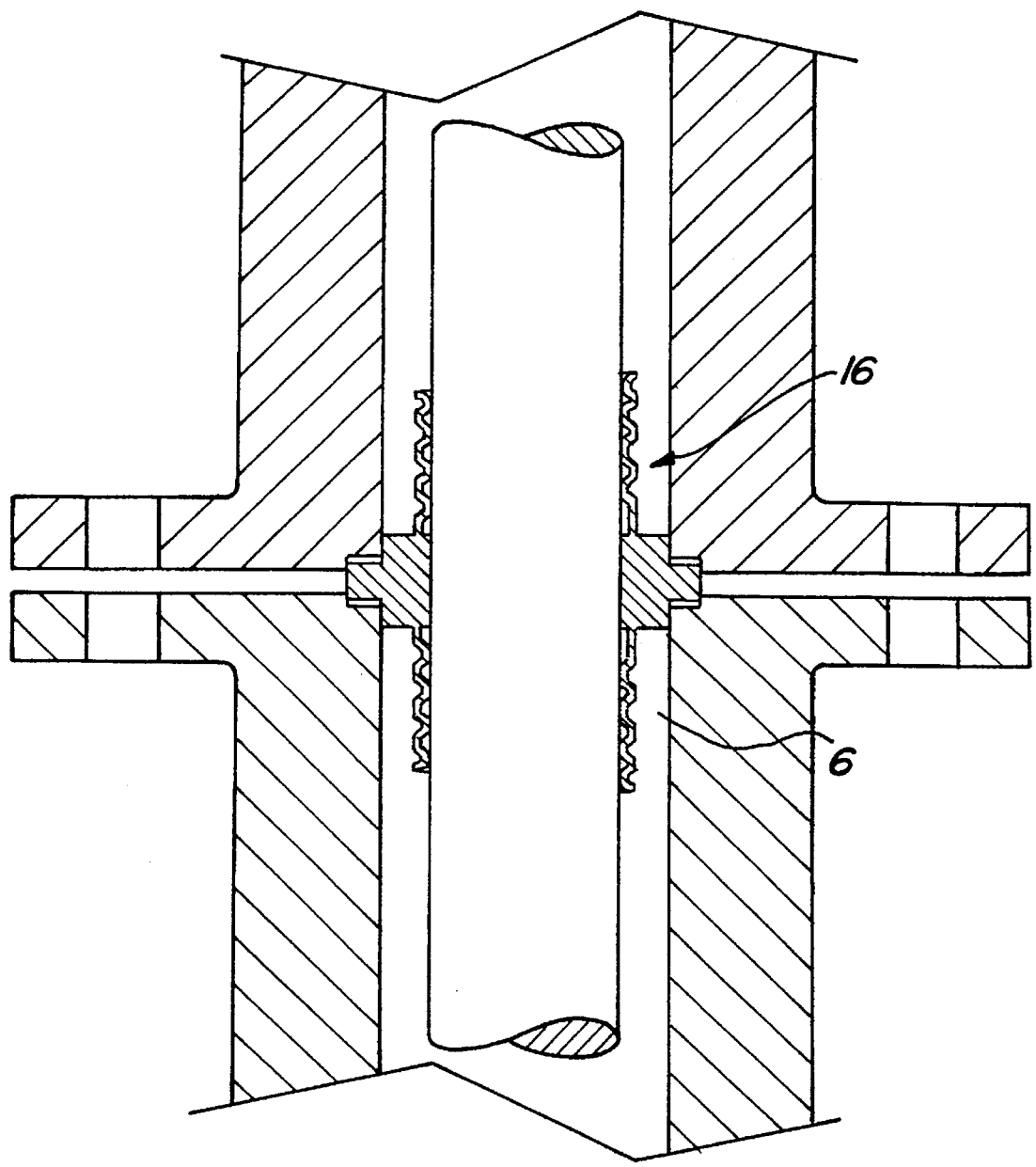
FIG. 7 is a sectional view of a third embodiment of the invention, showing the seal situated for use upon a valve stem.

FIG. 7 shows a further embodiment of the invention which has two sealing membranes 6, 16 which extend in respectively opposite axial directions.

As can be seen from FIG. 7, this seal is particularly effective in sub-sea operations as it can seal against escape of gas or oil, for example, in one direction and against external pressures, such as the sub-sea atmosphere, from the other direction.

It has been found that aluminium bronze, stainless steel and nickel alloys, in particular Inconel 718 to the NACE SPEC ("Inconel" is a registered trade name) have been found to be particularly suitable for use in the manufacture of the seal.

Although the illustrated examples incorporate an inclination of 6.5° between the channels and the plane perpendicular to the longitudinal axis of the sealing membrane, other angles have been found to be completely satisfactory. To a certain extent, the angle can depend upon the diameter of the seal. However, it has been found that particularly beneficial results are experienced if the angle is greater than or equal to 5° and less than or equal to 10°. It must be stressed, however, that the invention is not limited to seals having angles falling within this range, as other angles can provide the benefits sought by the invention.

We claim:

1. A stem seal comprising a cylindrical sealing membrane and membrane supporting means for supporting the sealing membrane, in use, in position about and in contact with a respective stem, wherein the sealing membrane has a radially inner face and a longitudinal axis, and comprises at least one loop-shaped channel arranged and adapted to encircle said stem when in use, and contact surfaces which bound said channel on said radially inner face of said membrane, said channel extending along a path that is inclined with respect to a plane perpendicular to the longitudinal axis of the membrane.

2. A stem seal according to claim 1, comprising a plurality of the said channels arranged at axial intervals for defining a labyrinth seal path for any fluid leaking between said radially internal surface of the sealing membrane and a radially outer surface of a stem located therein.

3. A stem seal according to claim 1, further comprising a support bearing for a said stem.

4. A stem seal according to claim 3, wherein the support bearing is provided on the membrane supporting means.

5. A stem seal according to claim 1, further comprising positioning means for positioning the seal, in use, in a body of a device into which the seal is to be installed.

6. A stem seal according to claim 1, wherein said channel is inclined at an angle of at least 5° with respect to said plane.

7. A stem seal according to claim 1, wherein said channel is inclined at an angle of not more than 10° with respect to said plane.

8. A stem seal according to claim 1, wherein said membrane has a mouth, via which said stem is to be accepted, which mouth is provided with a curved lip.

9. A stem seal according to claim 1, wherein said sealing membrane has a mouth, via which said stem is to be accepted, which mouth is inclined with respect to a plane perpendicular to the longitudinal axis of the membrane.

10. A stem seal according to claim 1, comprising two said sealing membranes extending coaxially in respectively opposite directions from a common said membrane supporting means.

11. A stem seal according to any preceding claim, formed from metal.

12. A stem seal according to claim 11, formed from aluminium bronze, stainless steel or nickel alloy.

13. A stem seal according to any of claims 1–10, further comprising a low friction coating.

* * * * *

UNITED STATES PATENT AND TRADEMARK OFFICE
CERTIFICATE OF CORRECTION

PATENT NO. : 5,577,742
DATED : November 26, 1996
INVENTOR(S) : Terence P. Nicholson and Michael J. C. Tozer It is certified that error appears in the above-indentified patent and that said Letters Patent is hereby corrected as shown below:

On the title page under Inventors, line 3 "Netherlands" should be --United Kingdom--.

Column 3, line 3, "stern" should be --stem--.

Column 4, line 43, "tee" should be --the--.

Signed and Sealed this

Seventeenth Day of June, 1997

*Attest:*

BRUCE LEHMAN

*Attesting Officer*  Commissioner of Patents and Trademarks